US009340191B2

(12) United States Patent
Yang et al.

(10) Patent No.: US 9,340,191 B2
(45) Date of Patent: May 17, 2016

(54) BRAKING SYSTEM FOR A VEHICLE

(71) Applicant: AUTOLIV ASP, INC., Ogden, UT (US)

(72) Inventors: Michael Yang, Westland, MI (US);
Ronald Posa, Commerce Township, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 203 days.

(21) Appl. No.: 13/799,655

(22) Filed: Mar. 13, 2013

(65) Prior Publication Data

US 2014/0265545 A1  Sep. 18, 2014

(51) Int. Cl.
B60T 11/20 (2006.01)
B60T 13/58 (2006.01)
B60T 13/74 (2006.01)
B60T 1/10 (2006.01)
B60T 7/04 (2006.01)

(52) U.S. Cl.
CPC ............... *B60T 13/588* (2013.01); *B60T 1/10* (2013.01); *B60T 7/042* (2013.01); *B60T 13/586* (2013.01); *B60T 13/745* (2013.01)

(58) Field of Classification Search
CPC ... B60T 13/588; B60T 13/142; B60T 13/745; B60T 7/04; B60T 7/042; B60T 13/686; B60T 8/4077; B60T 13/586; B60T 1/10
USPC .............. 303/14, 3, 10, 15, 151, 152
See application file for complete search history.

(56) References Cited

U.S. PATENT DOCUMENTS

| 2011/0115282 A1* | 5/2011 | Dinkel et al. | 303/3 |
| 2011/0254359 A1 | 10/2011 | Klimes et al. | |
| 2012/0248861 A1* | 10/2012 | Miyata et al. | 303/10 |
| 2015/0021977 A1* | 1/2015 | Miwa et al. | 303/15 |

FOREIGN PATENT DOCUMENTS

| DE | 102010038548 A1 | 2/2012 |
| WO | 2012019802 A1 | 2/2012 |

OTHER PUBLICATIONS

International Search Report regarding International Application No. PCT/US2014/014846, ISA/US dated May 21, 2014.
Written Opinion regarding International Application No. PCT/US2014/014846, ISA/US dated May 21, 2014.
U.S. Appl. No. 13/799,458, filed Mar. 13, 2013.
U.S. Appl. No. 14/157,709, filed Jan. 17, 2014.

* cited by examiner

*Primary Examiner* — Pamela Rodriguez
(74) *Attorney, Agent, or Firm* — Stephen T. Olson; Harness, Dickey & Pierce, P.L.C.

(57) ABSTRACT

A braking system for a vehicle having a hydraulic brake device for applying a friction brake force to at least one wheel of the vehicle includes a master cylinder and a mechanically controlled backup hydraulic cylinder. The master cylinder is in fluid communication with a reserve of brake fluid and in fluid communication with the hydraulic brake device. The master cylinder is operative to control the hydraulic brake device upon actuation. The mechanically controlled regulation backup cylinder is in fluid communication with the reserve of brake fluid and in fluid communication with the master cylinder. The backup hydraulic cylinder is mechanically controlled to move brake fluid therein and thereby actuate the master cylinder by delivering brake fluid to the master cylinder.

24 Claims, 4 Drawing Sheets

BRAKING SYSTEM FOR A VEHICLE

FIELD

The present disclosure generally relates to vehicle braking systems. The present teachings more particularly relate to a braking system for electric or hybrid electric vehicles including an electrical brake force generator and a mechanical brake force generator.

BACKGROUND

This section provides background information related to the present disclosure which is not necessarily prior art.

In a conventional vehicle, kinetic energy is converted into heat through friction braking. For example, when a driver applies a mechanical force to a brake pedal, a master cylinder converts the mechanical force into hydraulic pressure. The hydraulic pressure applies a force to a friction material, such as a brake pad, and forces the friction material against the sides of a disc attached to a wheel. The friction material against the disc creates friction and causes the wheel to slow or stop. Modern vehicles utilize a brake booster to reduce the amount of mechanical force the driver is required to apply to the brake pedal to effectively slow or stop the vehicle. The brake booster uses vacuum from the engine intake to boost the force applied by the brake pedal on the master cylinder.

Electrical vehicles rely solely on an electric propulsion system. Hybrid electric vehicles combine an internal combustion engine with an electric propulsion system. Electric and hybrid electric vehicles do not include a sufficient source of vacuum pressure for conventional brake booster actuation. As such, alternative arrangements are employed in electric vehicles to boost the force applied to the brake pedal on the master cylinder. For example, electric and hybrid electric vehicles may include electro-mechanical brake boosters.

In hybrid and electric vehicles, it is generally known to employ regenerative braking to activate a motor, such as a generator, during deceleration of the vehicle. Energy conventionally dissipated as heat during friction braking can be converted to electric energy and collected and stored in a battery. In this manner, energy may be conserved for subsequent use and thereby extend the electrical range of the vehicle under electrical power. Friction braking may be blended with regenerative braking by a vehicle ECU to provide the brake force requested by the driver.

While known braking systems have proven to be successful for their intended purposes, a continuous need for improvement in the relevant art remains.

SUMMARY

This section provides a general summary of the disclosure, and is not a comprehensive disclosure of its full scope or all of its features.

In accordance with one particular aspect, the present teachings provide a braking system for a vehicle. The vehicle includes a hydraulic brake device for applying a friction brake force to at least one wheel of the vehicle. The braking system includes a master cylinder and a mechanically controlled backup hydraulic cylinder. The master cylinder is in fluid communication with a reserve of brake fluid and in fluid communication with hydraulic brake device. The master cylinder is operative to control the hydraulic brake device upon actuation. The mechanically controlled backup hydraulic cylinder is in fluid communication with the reserve of brake fluid and in fluid communication with the master cylinder, the backup hydraulic cylinder is mechanically controlled to move brake fluid therein and thereby actuate the master cylinder by delivering brake fluid to the master cylinder.

In accordance with another particular aspect, the present teachings provide a braking system for a vehicle. The vehicle includes a hydraulic brake device for applying a friction brake force to at least one wheel of the vehicle. The braking system includes a first hydraulic cylinder, a mechanically controlled brake force generator and an electrically controlled brake force generator. The first hydraulic cylinder is in fluid communication with a reserve of brake fluid and in fluid communication with the hydraulic brake device. The first hydraulic cylinder is operative to control the hydraulic brake device upon actuation. The mechanically controlled brake force generator includes a second hydraulic cylinder. The second hydraulic cylinder is in fluid communication with the reserve of brake fluid and in fluid communication with the first hydraulic cylinder. In a panic stop, the mechanically controlled brake force generator may be mechanically controlled to move brake fluid within the second hydraulic cylinder by delivering brake fluid through the first hydraulic cylinder to control the hydraulic brake device. The electrically controlled brake force generator is operative for actuating the first hydraulic cylinder by moving brake fluid within the first hydraulic cylinder through movement of at least a first piston in the first hydraulic cylinder.

In accordance with still yet another particular aspect, the present teachings provide a method of braking a vehicle with a braking system. The braking system includes a hydraulic brake device for applying a friction brake force to at least one wheel of the vehicle, a first hydraulic cylinder in fluid communication with a reservoir of brake fluid and in fluid communication with a the hydraulic brake device and a second hydraulic cylinder in fluid communication with the first hydraulic cylinder. The method includes electronically operating a first brake force generator for actuating the first hydraulic cylinder by moving brake fluid within the first hydraulic cylinder through movement of at least a first piston in the first hydraulic cylinder. The method further includes mechanically operating a second brake force generator to move brake fluid within the second hydraulic cylinder by delivering brake fluid through the first hydraulic cylinder.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure FIG. 1 is a schematic illustration of a vehicle incorporating a braking system in accordance with the present teachings.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
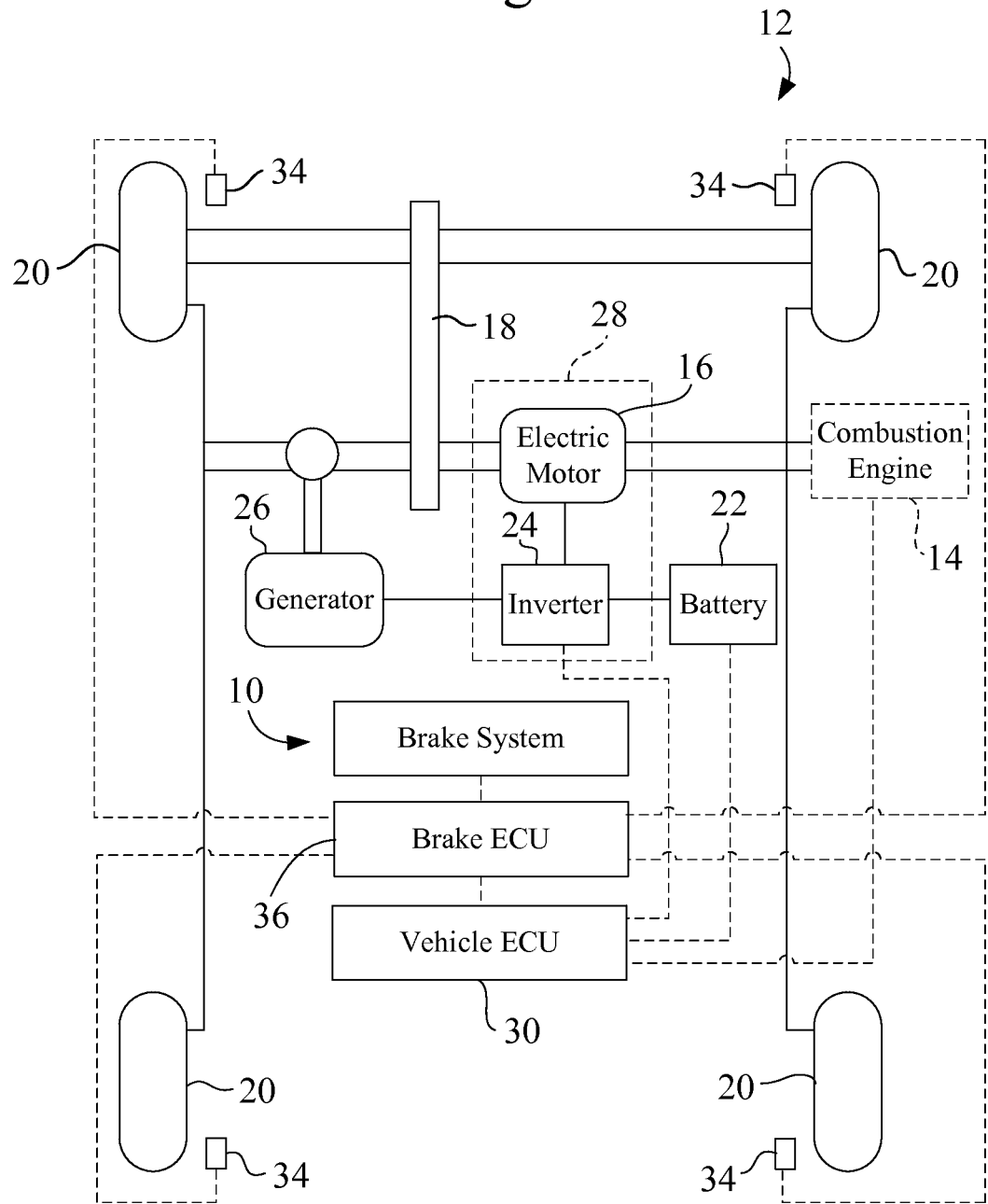

With initial reference to FIG. 1, a brake system for a vehicle constructed in accordance with the present teachings is schematically illustrated and generally identified at reference character 10. The braking system 10 is shown operatively incorporated into a motor vehicle 12. Before addressing the details of the braking system 10, a brief description of the exemplary use environment is warranted.

Within the scope of the present teachings, the exemplary vehicle 12 may be an electric vehicle (without internal combustion propulsion) or a hybrid electric vehicle (with internal combustion propulsion). As particularly illustrated, the vehicle 12 is a hybrid electric vehicle having an internal combustion engine 14 and an electric motor 16 for delivering torque to one or more wheels 20 of the vehicle through a transmission 18. In the embodiment illustrated, the internal combustion engine 14 and the electric motor 16 deliver torque to the front wheels 20 of the vehicle. The electric motor 16 improves fuel economy as compared to conventional internal combustion vehicles.

A battery 22 provides electric power for the vehicle 12. The battery 22 may provide DC electric power. An inverter 24 is electrically connected to the battery 22 to convert the DC voltages to AC voltages for the electric motor 16. The inverter 24 is also electrically connected to a generator 26 for supplying the generator 26 with AC electric power.

The vehicle 12 includes a regenerative braking arrangement 28 for converting kinetic energy of the vehicle 12 into electric energy to charge the battery 22. The regenerative braking arrangement 28 is defined by the electric motor 16 and the inverter 24. When the driver of the vehicle 12 depresses an input device, such as a brake pedal 29 conventionally mounted within a passenger compartment of the vehicle 12 (see FIGS. 2-7), a vehicle Electronic Control Unit (ECU) 30 operates the electric motor 16 is a reverse mode, causing the electric motor 16 to run backwards and slow the vehicle 12 by application of the resistance of the electric motor 16 through the transmission 18. In this mode, the electric motor 16 functions as an electric generator of AC electric power. The AC electric power generated by the electric motor 16 during regenerative braking is converted into AC electric power by the inverter 24 and delivered to the battery 22 for storage.

In addition to the regenerative braking arrangement 28, the vehicle 12 includes a friction braking arrangement 32 (see FIGS. 2-7). The friction braking arrangement 32 includes friction brakes 34 (e.g., disc brakes) associated with each of the vehicle wheels 20. The friction brakes 34 may be hydraulically controlled with brake fluid. As will be discussed further below, the friction brakes 34 may be electrically actuated by a brake ECU 36. The friction brakes 34 may also be mechanically actuated in response to a predetermined displacement of the brake pedal 29. As used herein, the term "mechanically actuated" may include hydraulic actuation and is intended to mean that the actuation occurs independent of electric power. During regenerative braking, the vehicle ECU 30 may coordinate a total braking force for the vehicle 12 by blending regenerative braking through the regenerative braking arrangement 28 and friction braking through electrical actuation of the friction brakes 34.

To the extent not otherwise described below, it will be understood that the exemplary use environment for the vehicle braking system 10 of the present teachings is conventional in both function and construction.

Figure 2:
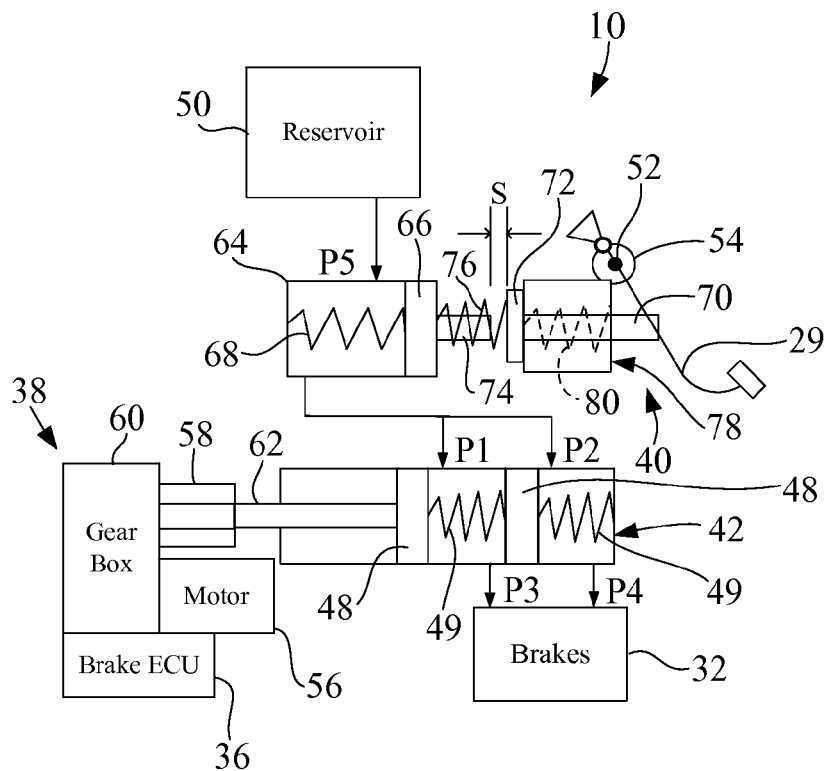
FIG. 2 is a schematic view of a vehicle braking system in accordance with the present teachings, the vehicle braking system shown in a non-braking situation.
Figure 3:
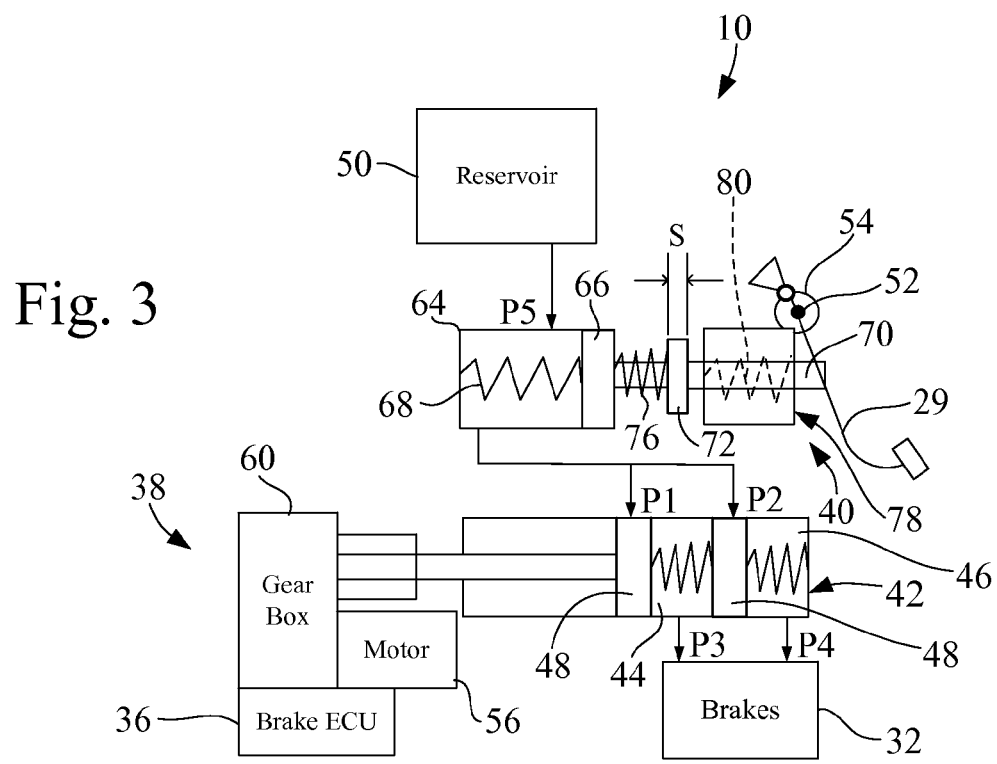
FIG. 3 is a schematic view similar to FIG. 2, the vehicle braking system of FIG. 2 illustrated in a cooperative regenerating braking situation.
Figure 4:
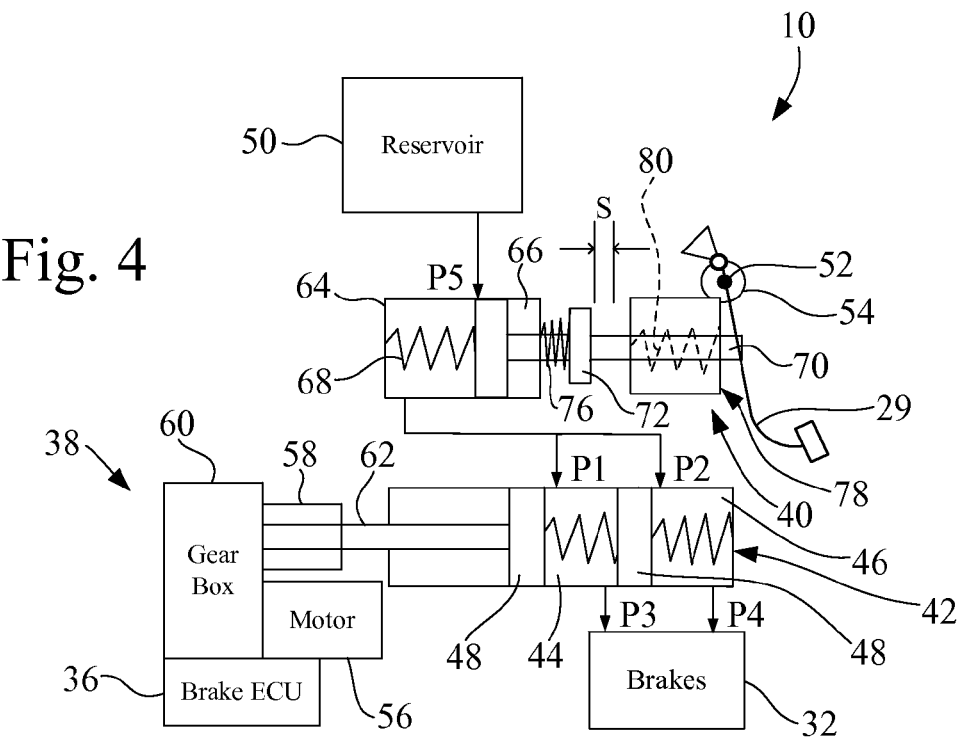
FIG. 4 is another schematic view similar to FIG. 2, the vehicle braking system of FIG. 2 illustrated in a safety stop situation.

With continued reference to FIG. 1 and additional reference to FIGS. 2 through 4, the braking system 10 of the present teachings will be further detailed. The braking system 10 is illustrated to generally include a first brake force generator 38 and a second brake force generator 40. The first brake force generator may be an electronic brake force generator 38. The second brake force generator may be and a mechanical brake force generator 40. The electronic and mechanical brake force generators 38 and 40 both cooperate with a first hydraulic cylinder 42 or master cylinder 42 to deliver hydraulic pressure to the friction braking arrangement 32.

The master cylinder 42 includes at least one piston 48 for moving brake fluid therein. The master cylinder may be a tandem master cylinder 42, defining first and second chambers 44 and 46 each associated with a piston 48 and a biasing member in the form of a pre-loaded spring 49. The chambers 44 and 46 are filled with brake fluid and in fluid communication with a reserve of brake fluid. The reserve of brake fluid may be disposed in a brake fluid reservoir 50. In the embodiment illustrated, each piston 48 operates a distinct brake circuit. For example, one of the brake circuits provides for frictional braking at two of the wheels 20 and the other brake circuit provides for frictional braking at the other of the two wheels 20. Brake fluid enters the master cylinder 42 through first and second ports P1 and P2 and exits the master cylinder 42 through third and fourth ports P3 and P4.

The brake pedal 29 is mounted within a passenger compartment of the vehicle 12 for rotation about a pivot axis 52. A pedal travel sensor 54 senses movement of the brake pedal 29 in response to the brake pedal 29 being depressed by the vehicle driver. In the embodiment illustrated, the pedal travel sensor 54 senses rotational displacement of the brake pedal 29 about the pivot axis 52. In other embodiments, the pedal travel sensor 54 may sense linear or other displacement of the brake pedal 29. The sensed displacement of the brake pedal 29 is electrically communicated to the brake ECU 36.

The electronic brake force generator 38 may include any mechanism operative to actuate the master cylinder 42 in response to sensed displacement of the brake pedal 29 by the pedal travel sensor 54. In the embodiment illustrated, the electronic brake force generator 38 generally includes an electric motor 56 controlled by the brake ECU 36. The electric motor 56 drives an output 58 through a gear box 60. The output 58 may include a nut and spindle, a ball screw assembly or other suitable components. The output 58 is coupled to an input rod 62 of the master cylinder 42. Upon actuation of the electric motor 56, the master cylinder 42 is controlled to deliver hydraulic pressure to the friction braking arrangement 32.

The mechanical brake force generator 40 is illustrated to generally include a second hydraulic cylinder or backup hydraulic cylinder 64. The backup hydraulic cylinder 64 is filled with brake fluid and in fluid communication with the brake fluid reservoir 50 through a fifth port P5. In the particular application illustrated, the backup hydraulic cylinder 64 and the master cylinder 42 (indirectly through the backup hydraulic cylinder 64) are in fluid communication with a common brake fluid reservoir 50. In other applications, the backup hydraulic cylinder 64 and the master cylinder 42 may be in fluid communication with separate reservoirs. In still yet other applications, the master cylinder 42 may be in direct fluid communication with a common brake fluid reservoir 50. The backup hydraulic cylinder 64 is in communication with the master cylinder 42 through the first and second ports P1 and P2.

The backup hydraulic cylinder 64 includes a piston 66 and a biasing member in the form of a pre-loaded spring 68. Upon actuation of the backup hydraulic cylinder 64 in a manner discussed further below, brake fluid is forced from the backup hydraulic cylinder 64 into the master cylinder 42. In turn, the master cylinder 42 delivers hydraulic pressure to the friction braking arrangement 32. While not preferred given the increased complexity, in alternative applications, fluid may be routed from the backup hydraulic cylinder 64 directly to the brakes (e.g., not through the master cylinder 42).

The mechanical brake force generator 40 is further illustrated to generally include a mechanical arrangement for mechanically coupling the brake pedal 29 to the piston 66 of the backup hydraulic cylinder 64. As discussed above, the mechanical brake force generator 40 operates independent of any electric power. As such, the mechanical brake force generator 40 will remain operative despite a loss of electrical power to the vehicle 12.

The mechanical arrangement for coupling the brake pedal 29 to the piston 66 includes a force transmitting member 70 for mechanically transmitting force input from the brake pedal 29 to the backup hydraulic cylinder 64. The force transmitting member is a movable element and may be in the form of a driver rod 70 movable from a first position to a second position in response to displacement of the brake pedal 29. The first position of the driver rod 70 is shown in the drawings in FIG. 2. The second position of the driver rod 70 is shown in the drawings in FIG. 4.

In the embodiment illustrated, the driver rod 70 has a first end in contact with the brake pedal 29 and a second end for driving the piston 66 of the backup hydraulic cylinder 64 to actuate the backup hydraulic cylinder 64. The driver rod 70 is linearly translatable between the first and second positions and indirectly coupled to the piston 66 such that a predetermined displacement S of the driver rod 70 is required before the piston 66 actuates the backup hydraulic cylinder 64. The predetermined displacement S of the driver rod 70 may be correlated to a corresponding rotation displacement of the brake pedal 29.

As illustrated, the second end of the driver rod 70 carries an enlarged portion or head 72. Prior to depression of the brake pedal 29, the head 72 is spaced from a piston rod 74 of the piston 66 by a distance. The distance provides a gap between the head 72 and the piston rod 74 that corresponds with the predetermined distance S. A biasing member 76 biases the driver rod 70 toward the brake pedal 29. As illustrated, the biasing member 76 may be a spring 76 that surrounds the piston rod 74 and extends between the head 72 of the driver rod 70 and the piston 66.

Depression of the brake pedal 29 displaces the driver rod 70 from the first position to the second position (from the right to the left as shown in FIGS. 2-4) against the bias of the spring 76. The head 72 of the driver rod 70 only engages the piston rod 74 after the driver rod 70 has been displaced the predetermined distance S. After such displacement, the piston 66 actuates the backup hydraulic cylinder 64.

The mechanical brake force generator 40 may further include a pedal feel simulator 78 for providing the driver with feedback from the braking system 10 in the form of resistance to pedal displacement as the brake pedal 29 is depressed. The pedal feel simulator 78 includes the spring 76 and includes an additional spring 80 surrounding the driver rod 70. The spring 76 may be a non-linear coil spring and thereby provide a nonlinear reaction force to the pedal travel. As such, the driver generally feels soft feedback in response to initial pedal displacement but stiffer feedback as the pedal travels more. Through selection of the spring 76, the pedal feel simulator may be independently tuned for particular vehicle designs.

A non-braking situation of the braking system 10 is illustrated in FIG. 2. In this situation, all of the ports P1-P5 are open. The braking system 10 is operative in a first mode (shown in FIG. 3) and a second mode (shown in FIG. 4).

The first mode of operation may be a cooperative regeneration mode in which the vehicle ECU 30 and the brake ECU 36 cooperative to blend regenerative braking by the regenerative braking arrangement 28 and frictional braking by the electronic brake force generator 38 to brake the vehicle 12. Within this first mode of operation, braking of the vehicle 12 may be a blend including 100% regenerative braking and 0% friction braking, 0% regenerative braking and 100% friction braking, or any ratio therebetween. The second mode may be a failed electric boost mode in which the electronic brake force generator 38 is not powered or otherwise does not sufficiently cooperate with the regenerative braking arrangement 28 to brake the vehicle 12.

The braking system 10 operates in the first mode in response to initial displacement of the brake pedal 29 by the driver. The pedal travel sensor 54 senses displacement of the brake pedal 29. In response to the displacement of the brake pedal 29, the brake ECU 36 controls the electronic brake force generator 38 to actuate the master cylinder 42.

In the first mode, the pistons 48 of the master cylinder 42 are driven by the electronic brake force generator 38 to close the first and second ports P1 and P2. Brake fluid is pushed out of the master cylinder 42 through the third and fourth ports P3 and P4. As a result, hydraulic pressure is delivered to the friction braking arrangement 32. In the first mode, the pedal feedback to the driver is provided by a combination of springs 80 and 76 in the pedal simulator 78. It will be understood however, that different combinations of spring(s) and damper(s) may be used in the pedal simulator 78.

Upon displacement of the driver rod 70 beyond the predetermined distance S in response to displacement of the brake pedal 29, the braking system 10 operates in the second mode. Such displacement may occur in the event of failure of the electronic brake force generator 38. In the second mode, the piston 66 actuates the backup hydraulic cylinder 64. The piston 66 closes the fifth port P5. The first, second, third and fourth ports P1-P4 remain open. Brake fluid is forced out of the backup hydraulic cylinder 64 and into the master cylinder 42. In turn, brake fluid is pushed out of the master cylinder 42, through the third and fourth ports P3 and P4, and hydraulic pressure is delivered to the friction braking arrangement 32. Again, it will be appreciated that the second mode of operation is completely independent from electrical control.

In the second mode or emergency back-up mode, the pedal feedback to the driver will be similar to a conventional braking system with a loss of brake force booster function. The required pedal force to achieve a given brake pressure, and consequently a corresponding vehicle deceleration will be higher than in a fully functioning system. The system will comply with the requirements for brake pedal force and deceleration for a failed boost situation as specified by FMVSS126.

Figure 5:
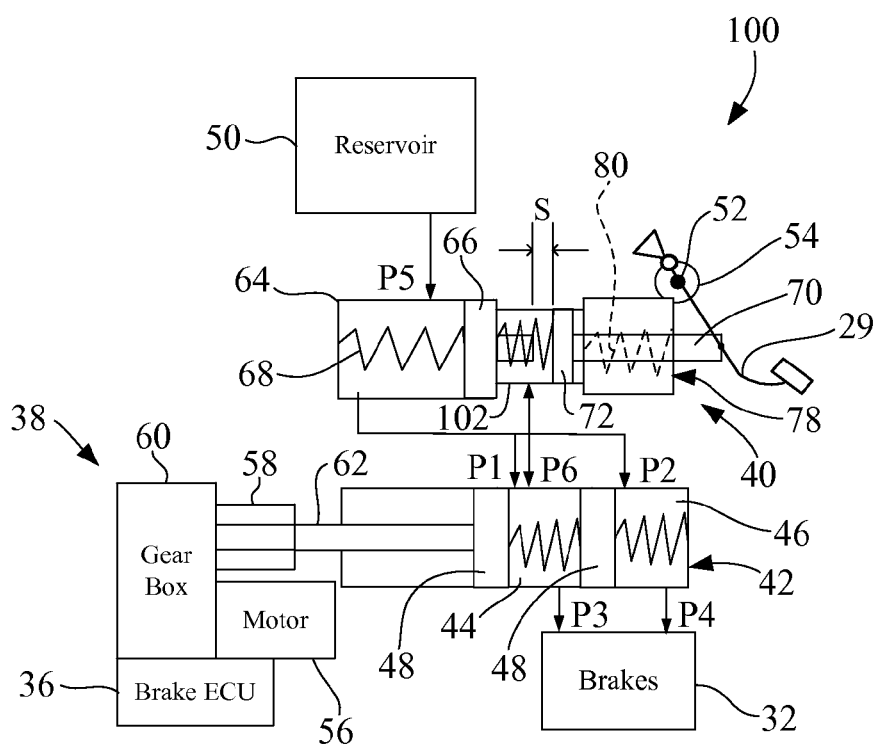
FIG. 5 is a schematic view of another vehicle braking system in accordance with the present teachings, the vehicle braking system shown in a non-braking situation.
Figure 6:
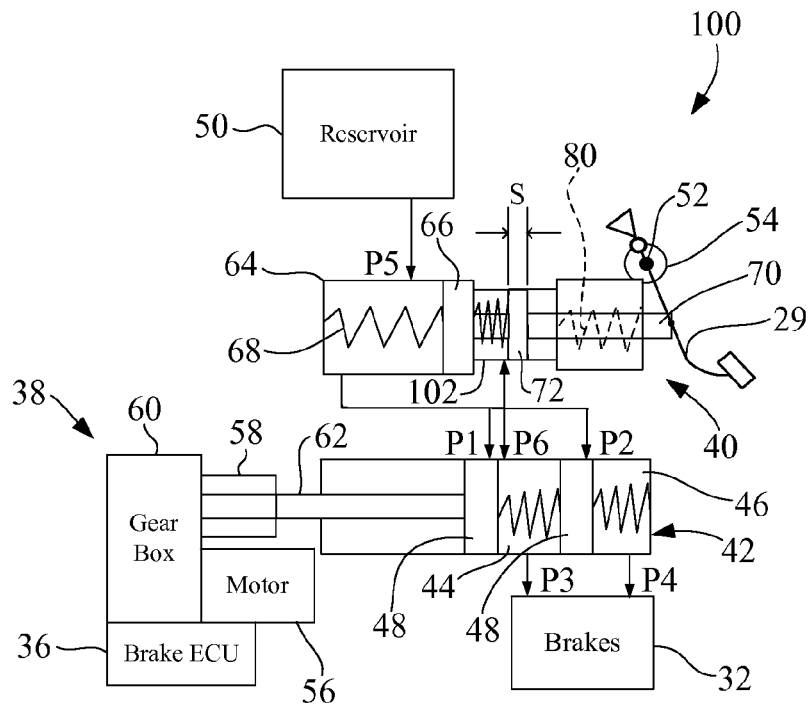
FIG. 6 is a schematic view similar to FIG. 5, the vehicle braking system of FIG. 5 illustrated in a cooperative regenerating braking situation.
Figure 7:
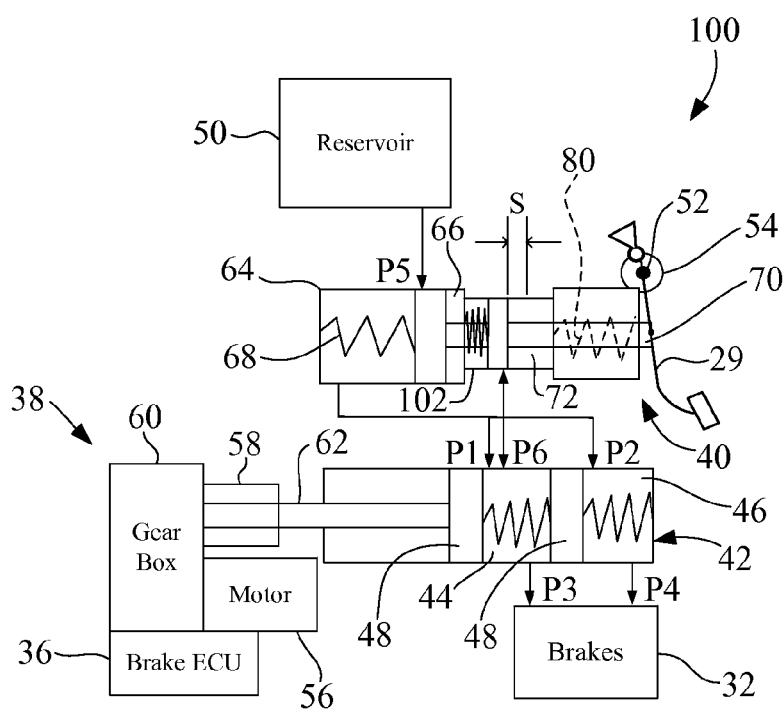
FIG. 7 is another schematic view similar to FIG. 5, the vehicle braking system of FIG. 5 illustrated in a safety stop situation.

Turning now to FIGS. 5-7, another braking system constructed in accordance with the present teachings is illustrated and identified with reference character 100. In view of the similarities between the braking system 10 and the braking system 100, like reference characters have been used to identify similar elements. The braking system 100 primarily differs from the braking system 10 by incorporating additional pedal feedback to the driver from hydraulic pressure generated in the master cylinder 42.

A chamber 102 is provided between the pedal feel simulator 78 and the backup hydraulic cylinder 64. The chamber 102 houses the head 72 of the driver rod 70, the piston rod 74 and the spring 76. The chamber 102 is in fluid communication with the master cylinder 42 through a sixth port P6. The sixth port P6 provides a feedback port that is always open. The head 72 of the driver rod 70 functions as a reaction disc in the chamber 102. The area of head 72 is normally multiple times smaller than that of piston 48. The ratio between the two helps determine the gain of this electrically actuated booster.

It will now be appreciated by those skilled in the art that the present teachings provide a braking system that is structurally very compact and includes a mechanism that is highly robust. The present teachings additionally provide mechanical pedal simulation that is simple and without solenoid valve and non-hydraulic control. Furthermore, the present teachings provide a modular system of which the pedal simulator may be readily adapted to various vehicles and various brake configurations while other parts of the system are standard.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A braking system for a vehicle, the vehicle including a hydraulic brake device for applying a friction brake force to at least one wheel of the vehicle, the braking system comprising;
 a master cylinder in fluid communication with a reserve of brake fluid and in fluid communication with hydraulic brake device, the master cylinder operative to control the hydraulic brake device upon actuation;
 a mechanically controlled backup hydraulic cylinder in fluid communication with the reserve of brake fluid and in fluid communication with the master cylinder, the backup hydraulic cylinder being mechanically controlled to move brake fluid therein by delivering brake fluid to the master cylinder and then to the brakes, the backup hydraulic cylinder including a displaceable piston; and
 a force transmitting member moveable by an input device to displace the displaceable piston; and
 wherein initial movement of the force transmitting member occurs without displacement of the piston.

2. The braking system of claim 1, wherein the master cylinder is indirectly in fluid communication with the reserve of brake fluid through the backup hydraulic cylinder.

3. The braking system of claim 1, further comprising an electric brake force generator for actuating the master cylinder by moving brake fluid within the master cylinder through movement of at least one master cylinder piston.

4. The braking system of claim 1, wherein the force transmitting member is spaced apart from the piston of the backup hydraulic cylinder prior to movement of the input device such that initial movement of the input device does not move brake fluid within the backup hydraulic cylinder to actuate the master cylinder.

5. The braking system of claim 1, further comprising a pedal feel simulator for providing a driver with feedback from the braking system, the pedal feel simulator including at least one spring, the at least one spring compressible during an initial movement of the force transmitting member.

6. The braking system of claim 5, wherein the at least one spring is operative to provide feedback to the driver through the force transmitting member and the input device during initial movement of the input device.

7. The braking system of claim 6, wherein the at least one spring is a non-linear spring.

8. The braking system of claim 1, wherein the mechanically controlled backup hydraulic cylinder is in fluid communication with the master cylinder through first and second ports, the first and second ports being normally open and closeable by an electrically controlled brake force generator.

9. The braking system of claim 8, wherein displacement of the force transmitting member beyond a predetermined distance as a result of failure of the electrically controlled brake force generator causes the displaceable piston of the backup hydraulic cylinder to close an input port associated with the backup hydraulic cylinder and force brake fluid out of the backup hydraulic cylinder and into the master cylinder to in turn apply the friction brake force.

10. A braking system for a vehicle, the vehicle including a hydraulic brake device for applying a friction brake force to at least one wheel of the vehicle, the braking system comprising:
 a first hydraulic cylinder in fluid communication with a reserve of brake fluid and in fluid communication with the hydraulic brake device, the first hydraulic cylinder operative to control the hydraulic brake device upon actuation;
 an electrically controlled brake force generator for actuating the first hydraulic cylinder;
 first and second input ports associated with the first hydraulic cylinder, the first and second input ports being normally open;
 a mechanically controlled brake force generator including a second hydraulic cylinder, the second hydraulic cylinder in fluid communication with the reserve of brake fluid through a third input port and in fluid communication with the first hydraulic cylinder through the first and second input ports, the mechanically controlled brake force generator being mechanically controlled to move brake fluid within the second hydraulic cylinder and thereby pressurize the first hydraulic cylinder by delivering brake fluid to the first hydraulic cylinder in response to movement of a driver controlled input device beyond a predetermined distance; and first and second pistons in the first hydraulic cylinder, the first and second pistons movable in response to initial movement of the driver controlled input device below the predetermined distance to close the first and second input ports and force brake fluid from the first hydraulic cylinder to apply the friction brake force.

11. The braking system of claim 10, wherein the system is operative in a first mode during initial movement of the driver controlled input device in which the first hydraulic cylinder is actuated electronically by the electrically controlled brake force generator and a second mode when the driver controlled input device is moved beyond a predetermined distance in which the second hydraulic cylinder is actuated mechanically by the mechanically controlled brake force generator.

12. The braking system of claim 11, further comprising a brake pedal and wherein the system operates in the first mode in response to a first displacement of the brake pedal by a driver of the vehicle and the system operates in the second mode in response to a second displacement of the brake pedal by the driver.

13. The system of claim 12, wherein the first displacement of the brake pedal is greater than the second displacement of the brake pedal.

14. The braking system of claim 10, wherein the mechanically controlled brake force generator includes a force transmitting member mechanically movable in response to an action by a driver of the vehicle to mechanically displace a second piston of the second hydraulic cylinder.

15. The braking system of claim 14, wherein the force transmitting member is spaced apart from the second piston of the second hydraulic cylinder prior to movement of the action by the driver such that initial action by the driver does not move brake fluid within the second hydraulic cylinder to actuate the first hydraulic cylinder.

16. The braking system of claim 14, further comprising a biasing member disposed between the second piston of the second hydraulic cylinder and the force transmitting member for biasing the force transmitting member away from the second piston of the second hydraulic cylinder.

17. The braking system of claim 16, wherein the biasing member is a non-linear spring operative to provide feedback to the driver.

18. The braking system of claim 10, wherein the second hydraulic cylinder includes a piston moveable in response to movement of the driver controlled input device to close the third input port.

19. The braking system of claim 10, wherein the system includes a brake pedal and wherein the system operates in a first mode to operate the electrically controlled brake force generator in response to a first displacement of the brake pedal by a driver of the vehicle and the system operates in a second mode to operate the mechanically controlled brake force generator in response to a second displacement of the brake pedal by the driver.

20. A method of braking a vehicle with a braking system, the braking system including a hydraulic brake device for applying a friction brake force to at least one wheel of the vehicle, a first hydraulic cylinder in fluid communication with a reservoir of brake fluid and in fluid communication with the hydraulic brake device and a second hydraulic cylinder in fluid communication with the first hydraulic cylinder through first and second normally open input ports, the method comprising:

operating the system in a first mode by electrically operating a first brake force generator for actuating the first hydraulic cylinder by moving brake fluid within the first hydraulic cylinder through movement of at least a first piston in the first hydraulic cylinder in response to movement of a driver controlled input device between an initial position and a predetermined position; and operating the system in a second mode by mechanically operating a second brake force generator to move brake fluid within the second hydraulic cylinder and thereby actuate the first hydraulic cylinder by delivering brake fluid to the first hydraulic cylinder in response to further movement of the driver controlled input device beyond the predetermined position.

21. The method of braking a vehicle with a braking system of claim 20, wherein the second brake force generator includes a displaceable piston for moving brake fluid therein in response to movement of the driver controlled input device, the second brake force generator further including a force transmitting member spaced apart from the displaceable piston prior to movement of the input device such that initial movement of the input device does not move brake fluid within the second hydraulic cylinder to actuate the hydraulic brake device.

22. The braking system of claim 20, wherein the second mode is a failure mode in which the braking system is without electric power.

23. The braking system of claim 20, wherein electrically operating the first brake force generator includes moving the first piston to close the first and second input ports associated with the first hydraulic cylinder and mechanically operating the second brake force generator includes closing a third input port associated with the second hydraulic cylinder while the first and second input ports remain open.

24. The braking system of claim 23, wherein the first and second modes are distinct.

* * * * *